(12) United States Patent
Randolph

(10) Patent No.: US 12,619,343 B2
(45) Date of Patent: May 5, 2026

(54) INSPECTION TEMPLATES AND ADMINISTRATIVE CONTROLS

(71) Applicant: UScope Technologies, Inc., Atlanta, GA (US)

(72) Inventor: Earl Randolph, Atlanta, GA (US)

(73) Assignee: UScope Technologies, Inc., Atlanta, GA (US)

( * ) Notice: Subject to any disclaimer, the term of this patent is extended or adjusted under 35 U.S.C. 154(b) by 103 days.

(21) Appl. No.: 18/215,145

(22) Filed: Jun. 27, 2023

(65) Prior Publication Data

US 2023/0418454 A1     Dec. 28, 2023

Related U.S. Application Data

(60) Provisional application No. 63/355,979, filed on Jun. 27, 2022.

(51) Int. Cl.
*G06F 3/04847*       (2022.01)
*G06F 3/0482*       (2013.01)
*G06F 3/04845*       (2022.01)

(52) U.S. Cl.
CPC ........ *G06F 3/04847* (2013.01); *G06F 3/0482* (2013.01); *G06F 3/04845* (2013.01)

(58) Field of Classification Search
None
See application file for complete search history.

(56) References Cited

U.S. PATENT DOCUMENTS

| | | | | |
|---|---|---|---|---|
| 9,027,077 B1 * | 5/2015 | Bharali | ................... | G06F 21/00 |
| | | | | 726/1 |
| 9,204,247 B2 * | 12/2015 | Liu | ........................ | H04W 4/029 |
| 11,911,200 B1 * | 2/2024 | Alpert | .................... | G16H 30/40 |
| 2008/0309643 A1 * | 12/2008 | Arimoto | ............. | G06F 3/04886 |
| | | | | 345/173 |
| 2009/0006411 A1 * | 1/2009 | Lele | ........................ | G06Q 10/00 |
| | | | | 707/999.009 |
| 2010/0174656 A1 * | 7/2010 | Nolan | ................... | G06Q 10/103 |
| | | | | 709/204 |
| 2014/0297430 A1 * | 10/2014 | Rezvani | ............. | G06Q 30/0276 |
| | | | | 705/14.72 |
| 2014/0365574 A1 * | 12/2014 | Franks | ................ | H04L 12/1895 |
| | | | | 709/204 |
| 2015/0009311 A1 * | 1/2015 | Sasaki | ................ | A61B 1/00009 |
| | | | | 348/74 |

(Continued)

*Primary Examiner* — Tuyetlien T Tran
*Assistant Examiner* — Samuel Shen
(74) *Attorney, Agent, or Firm* — Clayton, McKay & Bailey, PC

(57) ABSTRACT

Systems and methods presented herein can allow an inspector or other user to document damage or other property information using a mobile device, such as their cell phone. An administrative console can allow an administrator to create an inspection template. The inspection template can include categories and subcategories with instructional media. A user device can receive the inspection template when assigned to a job that utilizes the inspection template. An inspection application on the user device can then present the instructive media based on which category and subcategory the user is attempting to complete. The application can display a two-way dialog with the administrator and a dynamic report where pictures and comments are posted.

20 Claims, 14 Drawing Sheets

(56)                    References Cited

U.S. PATENT DOCUMENTS

| | | | |
|---|---|---|---|
| 2018/0025451 A1* | 1/2018 | Randolph | G06Q 50/163 |
| | | | 705/314 |
| 2022/0300599 A1* | 9/2022 | Farrelly | G06F 21/36 |
| 2022/0414735 A1* | 12/2022 | Rubinson | G06N 20/00 |
| 2023/0307147 A1* | 9/2023 | McGuire | G16H 40/20 |

* cited by examiner

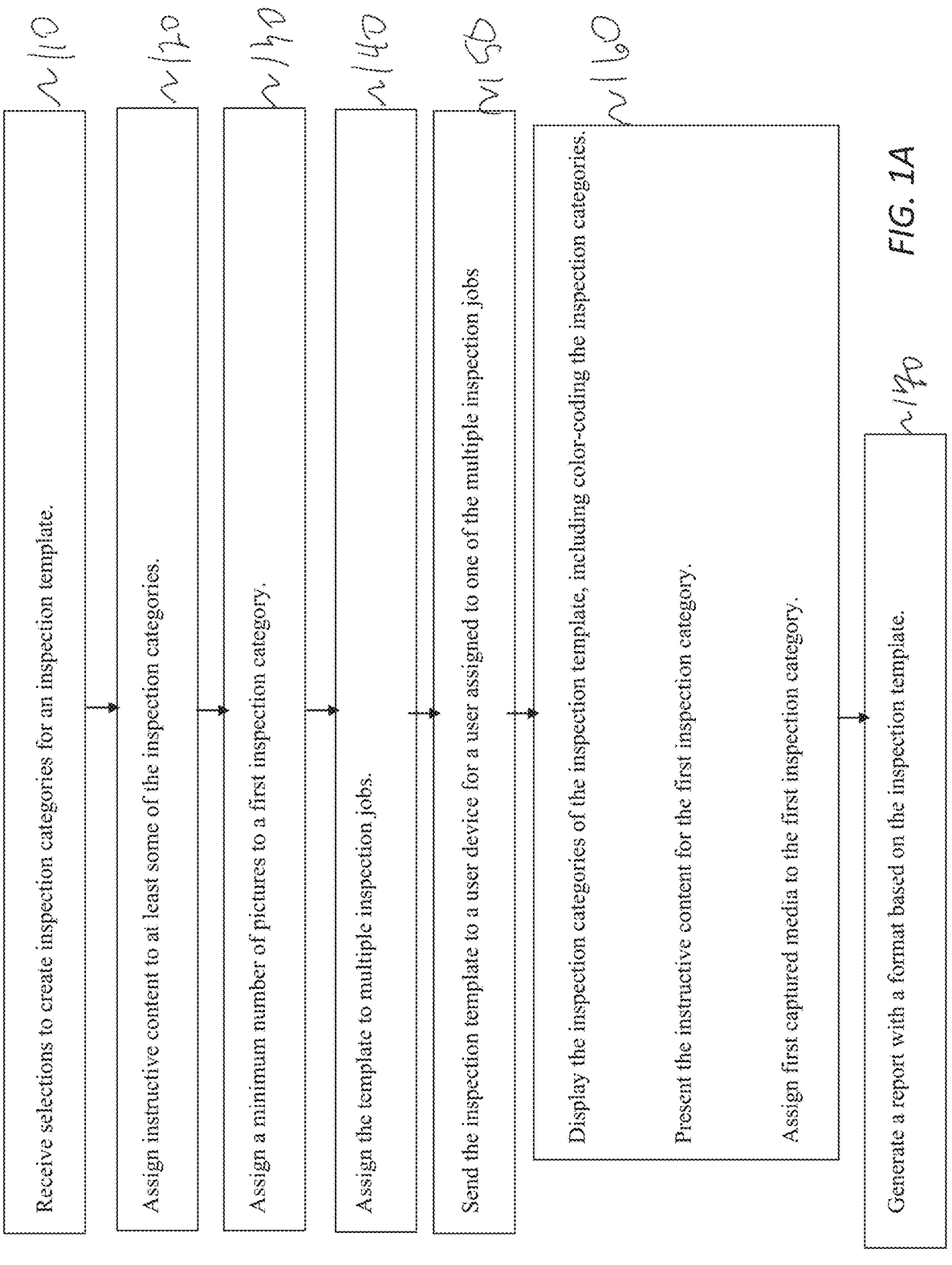

Receive selections to create inspection categories for an inspection template.  ~110

Assign instructive content to at least some of the inspection categories.  ~120

Assign a minimum number of pictures to a first inspection category.  ~130

Assign the template to multiple inspection jobs.  ~140

Send the inspection template to a user device for a user assigned to one of the multiple inspection jobs  ~150

Display the inspection categories of the inspection template, including color-coding the inspection categories.  ~160

Present the instructive content for the first inspection category.

Assign first captured media to the first inspection category.

Generate a report with a format based on the inspection template.  ~170

FIG. 1A

INSPECTION TEMPLATES AND ADMINISTRATIVE CONTROLS

RELATED APPLICATIONS

This nonprovisional application claims benefit to U.S. provisional application No. 63/355,979, titled "Inspection Templates and Administrative Controls," filed on Jun. 27, 2022, which is herein incorporated in its entirety by reference for all purposes.

BACKGROUND

Inspectors for insurance or contracting companies routinely visit homes and other buildings to assess damage, estimate repair costs, or to develop bids for additional construction at the property. During a visit, the inspector usually sketches a floor plan and makes notes about various areas of the home. The inspector can also take pictures of damaged areas of a home or areas that will be upgraded, such as a rooftop for a solar installation or roofing job. The inspector later prepares the pictures and floor plan as part of preparing an actual estimate. This is typically a manual process where the inspector finds photos and associates them with various sections of the report.

However, there are several drawbacks to this common approach. One drawback is that the inspector might take fewer photos than needed. When this happens, it can be difficult to accurately project damage costs or put together a sufficiently descriptive report. The inspector or another inspector might need to revisit the property to take more pictures or describe more areas of the home. When an inspector does not have much experience with a type of property or job, the chances of insufficient information collection increase.

Additionally, it is not always possible for the inspector to ask questions or get instructive help during the job. This is because many inspection sites can be in areas that currently lack cell reception or any means of internet connection. For example, after a tornado, an entire area can be without adequate communication services. This same area is likely subject to many inspection jobs.

Additionally, pictures can get lost or the inspector might not remember what room they depict. Over the course of a long day, where the inspector might take hundreds of photos, the inspector might not even remember what damage was being documented. It might be difficult to determine which pictures apply to which notes.

Finally, the inspector might not add the right information and pictures to an inspection report. Each company, such as an insurance company or contracting company, may require different sets of information and pictures in a report in order to perform company tasks such as creating estimates.

Therefore, a need exists for inspection templates and administrative controls in performing property inspections.

SUMMARY

An example described herein includes inspection templates and administrative controls. In one example, a mobile device, such as a cell phone or tablet, executes an application for capturing media and other information for inspection jobs. Inspection jobs can relate to insurance claims or contractor bids. The application can display a graphical user interface ("GUI") that allows a user to take pictures and add descriptions. The application can categorize the pictures and descriptions according to an inspection template for a particular inspection job.

The templates can be creating using an administrative console GUI. The console can include options for creating categories and subcategories. For example, a template for home inspection can include interior and exterior categories. The template can also include one or more levels of subcategories, such as right elevation and back elevation, hall, kitchen, bedroom, and so on. For each category (including subcategories), the administrator can include instructive content, such as text, audio, and/or video, that explains what is needed from the inspector in each category. The administrator can also specify a minimum number of pictures or videos for each category. The instructive content can explain different picture angles that are needed in a particular room that is one of the categories, for example.

The templates can be saved and then assigned to particular inspection jobs. For example, the administrator can assign a first template to an automobile inspection job and a second template to a home inspection job. In one example, the console allows for assigning different templates to different groups of jobs, such as jobs grouped by type, customer (such as a corporation), or by inspector. For example, some customers may be home inspection companies and some inspectors might specialize in a particular job type.

The inspector can then receive their jobs on an inspection application that executes on their user device. Each job can include the categories specified by the template assigned to that job. In addition, the application can color-code the categories differently based on progress towards completion of the category criteria that was assigned by the administrator and saved as part of the template. For example, green can indicate that all photos and video have been taken for a category, whereas red can indicate new instructions or incomplete progress towards satisfying the instructions. Yellow can indicate that some of the instructions have been met but not all.

For each category, the application can include the instructive content, allowing the user to know what is needed to complete information capture for each category. For example, categories for a home inspection template can represent property features of the house. These can be a room, an elevation, or a room feature such as cabinetry or fireplace. Pictures, video, and text recorded by the inspector can be stored in association with the category. Storage can initially be locally on the computing device but can include uploading the category-associated media to the cloud when connectivity allows.

The templates can also include report specifications used to automatically generate a report. For example, when the inspector has completed the categories, the report can be automatically generated according to the template and using the media captured by the inspector for each category.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various examples and together with the description, serve to explain the principles of the disclosure. In the drawings:

FIG. 1A is an exemplary illustration of a flowchart for improved property inspection management.

DESCRIPTION OF THE EXAMPLES

Figure 1B:
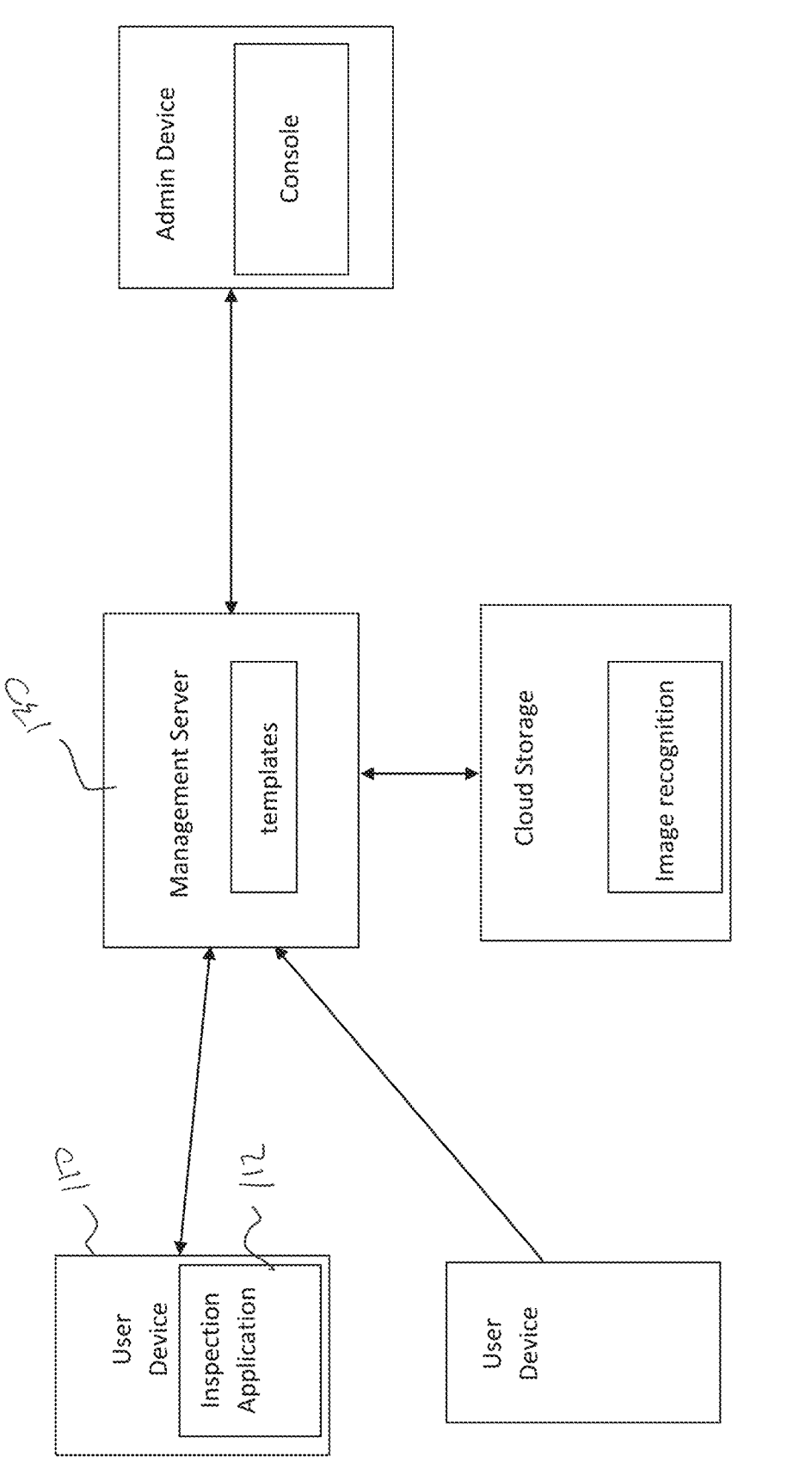
FIG. 1B is an exemplary illustration of a system for improved property inspection management.

Reference will now be made in detail to the present examples, including examples illustrated in the accompanying drawings. Wherever possible, the same reference numbers will be used throughout the drawings to refer to the same or like parts.

In one example, the system allows a user to easily document properties for insurance estimates. A user device, such as a phone or tablet, can execute an inspection application for documenting property for purposes of assessing damage, value, or renovation bids. The user can select a job, such as a house at a particular address.

The user can then take pictures, video, audio, or text that are stored in association with property categories defined by an inspection template. Capturing the media can include capturing video or captions. For example, the user can hold the picture button of the graphical user interface ("GUI") and the application can record audio while the picture button is held. The picture can then be stored in association with the category, the caption, and the audio/video for later retrieval.

The user can open a dynamic and interactive report associated with the property. The pictures can be sorted by category, which can be property features, such as rooms. When the user selects a picture, the tag and audio can also be presented. This can greatly decrease the time it takes to both document and review an insurance claim.

FIG. 1A is an exemplary illustration of a flowchart for improved property inspection management.

At stage 110, a GUI of an administrative console or inspection application can receive selections to create inspection categories for an inspection template. The categories can be named to describe the portion of the property to inspect. The inspection categories include base categories and subcategories that are organized at a hierarchically lower level than the base categories.

The user can apply names to the inspection categories using the GUI. This can allow for making custom templates with common inspection categories, such as a roof and a master bedroom for a house template.

At stage 120, a user (administrator or user performing the job) can assign instructive content to at least some of the inspection categories. The instructive content can explain what is needed from an inspector for the respective category. For example, the instructive content can identify particular features to capture in video or photographs.

At stage 130, a minimum number of pictures can be assigned to an inspection category. A minimum can also be assigned to the job as a whole. This can ensure that the category is adequately documented.

These minimum number of pictures can be editable. In one example, they are only editable by an administrator but not editable by another user type.

At stage 140, the template can be assigned by an administrator or user to multiple inspection jobs. This can include organizing jobs by user, job type, or inspection category and applying the template to multiple such jobs at once. For example, "home inspection" and "roof inspection" can be two different job types.

The template can be selected from amongst multiple stored templates. In addition, the GUI can allow for changing the template. In one example, the user can select a menu item to change a current template. Available templates can be presented, such as in a drop-down menu. A template can be previewed, such as by highlighting it. The can cause the GUI to display a preview template that shows a hierarchy of a potential inspection template. The preview can be displayed prior to actually assigning the template to one or more inspection jobs.

At stage 150, the template is sent to the user device associated with a user assigned to one or more jobs associated with the template. The template can determine the categories and instructions that appear on the user device for the job. In particular, an inspection application executing on the user device can display the categories and instructions.

Stage 160 includes multiple steps performed by the inspection application. These can include displaying the inspection categories of the inspection template. The categories can be color-coded according to completeness of the respective category. For example, if the minimum number of photos or videos have been taken, the category can highlight green. In general, a first color indicates the new instructive content exists. A second color indicates that the user has taken the minimum number of pictures for the first inspection category. A third color can indicate that the user has taken less than the minimum number of pictures for the first inspection category.

When a user selects a category, the instructive content for that category can be displayed or play for the user. This makes it easy for the user to know what to document or capture. The instructive content can include a video file that plays within the inspection application. The instructive content can explain different pictures that are needed in a room. The user can take pictures or video, and the captured media can be assigned to the current inspection category.

In one example, pictures or video can be taken before a category is selected. In this instance, the captured media can be given an unassigned status and stored in a folder for unassigned media. The GUI can then allow for later selection of the unassigned media for assigning it to an inspection category, such as the first inspection category.

At stage 170, the application can also generate a dynamic inspection report with a format based on the inspection template. The report organizes the captured media according to the inspection categories for which it was captured. Also, the media can serve as a whiteboard for user annotations. A machine learning model or algorithm can also suggest labels for the media. And communications between any users assigned to the job can take place within the category and show up in the interactive report when that feature is enabled. This can allow users to later recall specifics of exactly what occurred during the inspection.

The inspection template can be saved and assigned to future jobs. In one example, the inspection template is assigned by job type.

The administrative console can display a completion status jobs assigned to various users. The administrator can also view the dynamic reports in real time. This allows the administrator to provide additional instructive content regarding a particular inspection category of a job. The inspection application can update its GUI for that category to indicate the new instructive content exists.

The inspection application can store captured media in a cloud storage. An image recognition process can identify and suggest labels for features on the captured media. Those labels can appear in the dynamic report. The suggested labels can be based on prior labels added to prior captured media. The administrative console and the inspection application can present a chat space within a category for the administrator and user to both post messages and see messages. Each category can have its own chat space. Likewise, the administrator can make annotations on the captured media that appear within the inspection application.

As mobile app users are self guided to remotely capture specific images with text or voice automated inspections for any photo documentation task, the app's image recognition feature can also identify if the captured images were not the correctly captured per the client's specs, which then can auto prompt the user to recapture the image and also provide the user with additional automated guidance with instructional text, images, or videos to help demonstrate the appropriate visual characteristics that the image or video should possess per the user's request by hand gesture or verbal prompt.

FIG. 1B shows an exemplary illustration of a system for improved inspection management. The system can include an administration console that executes at a management server. The administration console can include a GUI that allows an administrator to assign jobs to users, such as inspectors. The administration console also allows the administrator to create and save inspection templates.

Templates can be saved into groups. For example, different template groups for farmhouses and high rises are possible. The types of things to inspect can differ between those properties.

Inspection templates can be created to include categories for organizing captured media, such as pictures, text, audio, and video. For example, each room of a house can be its own category. The exterior of the house can be a category, and different perspectives can also be categories within the exterior category. The administrator can add categories and nest categories within each other to organize the capture of information.

The administrator can then assign instructions to categories. For example, the administrator can add instructions to describe what sorts of pictures the user needs to take in a particular room. The instructions can be text, video, or audio. The administrator can assemble instructions in one pane of the GUI and then assign them to one or more categories.

Additionally, the administrator can specify a minimum number of pictures that must be taken by the user for a category. This can help ensure that the user will adequately document a room or other feature represented by the category. A minimum picture amount can be assigned to the project as a whole as well.

The console can allow the administrator to assign saved inspection templates to jobs. This can include assigning a template to all jobs with a particular job type, customer, or user. The templates can ensure that the user captures all of the correct information and media while at the jobsite.

The user can be an inspector, such as an appraiser or insurance adjuster. The user can use a user device 110 for some of the system functions. The user device 110 can be a mobile computing device, such as a cell phone, tablet, laptop, or smart camera. The user device 110 can include a camera component for taking a picture or video.

In one example, an inspection application 112 executes on the user device 110. The inspection application 112 can communicate over a network with the management server 130. The network can be the internet, a cellular network, a local area network, a workstation peer-to-peer network, a direct link network, a wireless network, or any other suitable communication platform.

The inspection application 112 can communicate with the management server 130 to receive jobs assigned to the user. The jobs can be downloaded with the respective inspection templates. When the user visits a jobsite, therefore, the inspection template can already be on the user device 110. This can allow the user to follow the template and the associated instructions even when there is no cell coverage or internet connection available at the jobsite.

The inspection application 112 can also include an interactive communication window. The window can be present when the user is within any of the categories. This can allow an administrator to talk to the user or provide further instructions based on review of what media the user has captured so far for that category.

In one example, the user can modify the template and save the template. This can be done by selecting a button on the GUI of the inspection application. This can allow a user to modify the template, such as based on feedback they get from other reports. Saved templates can then be shared with other users, such as with a team of inspectors doing similar inspection types.

The inspection application can include a color code for a category to indicate the completeness of the category. For example, white can indicate no instructions are assigned to the category. Green can indicate that the minimum photos have been taken for the category. Red can indicate that instructions exist for the category that have not been addressed yet. This can include new instructions since the user last acted on the category. Orange can indicate that the instructions are partially fulfilled, such as some pictures but not the minimum.

In one example, when the category turns green, the user is presented with a button to go to the next category. In another example, the next category automatically opens and the user can receive those instructions.

The status of the job likewise can display in the administrative console. This can allow an administrator to see how a user is doing at completing their assigned jobs and provide additional feedback or instructions as needed.

Images can be viewed in real time on the console if the user device has internet or cell connectivity. This allows for real time color code changes on the administrative console as well. The administrator can then know exactly where in the inspection process the user is. This can allow the administrator to provide timely advice and even allow for a conversation between the user and the administrator. For example, the administrator can review the photos, see that damage is not clearly shown, and explain to the user a new angle to better capture the damage.

The administrative console can also display a map that reveals the location of active users making inspections. This can allow the administrator to reassign or assign a job based on the current proximity of a user to the job. In one example, the administrator can merely add extra team members (e.g., a second user) to the job. The second user can then access an updated template with whatever pictures the first user has added to categories. This can allow a second user to finish a job started by a first user, such as when additional pictures are needed for a category.

In one example, the users assigned to a job can all chat about the job within the inspection application. This can allow for assigning a team of members to one or more jobs. The team members can all help each other even when they are not in physical proximity by seeing a user's progress and pictures for a job and chatting with the user within the inspection application.

The console and inspection application can include a task manager with scheduling system. The scheduling platform can enable users to set reminders for themselves, team members, or associated vendors to perform future tasks at future dates and times for a property. This can all be done from within the automated inspection guidance instruction window in the app's camera. This feature can allow the original inspector to set a reminder to follow-up on a job that needs to be completed in a property's kitchen, on the body of a vehicle, or a piece of equipment that needs repair. These reminders can be set to notify yourself, management, other team members or external vendors assisting on the same assignment task within the system, by text. by email or through other systems integrated with the platform's API.

The administrative console can also allow for turning on and off functionality that is available within the inspection application for a user.

In one example, a cloud storage is used to store captured media. The media can upload from the user device whenever an internet connection is available to lower the risk of lost information if the user device were to get lost or broken. In one example, media is uploaded when selected by the user.

The user can be incentivized to upload the photos by having an image recognition process that labels the photos or video that is in the cloud storage. The labels can be based on prior labels for similar recognized damage. Additionally, the labels can be presented as suggestions to the user. The user can then either approve or disapprove of the level by tapping the label or some other button.

FIGS. 2-7 are example GUI screens for an admin console. Alternatively, these features can also be available in the inspection application on the user device. This can allow users to customize their own templates, in an example. The availability of these features to users can be based on user profiles setup by an administrator. Some users may be trusted more than others to create their own templates or make changes to the template originally created by an administrator.

Figure 2:
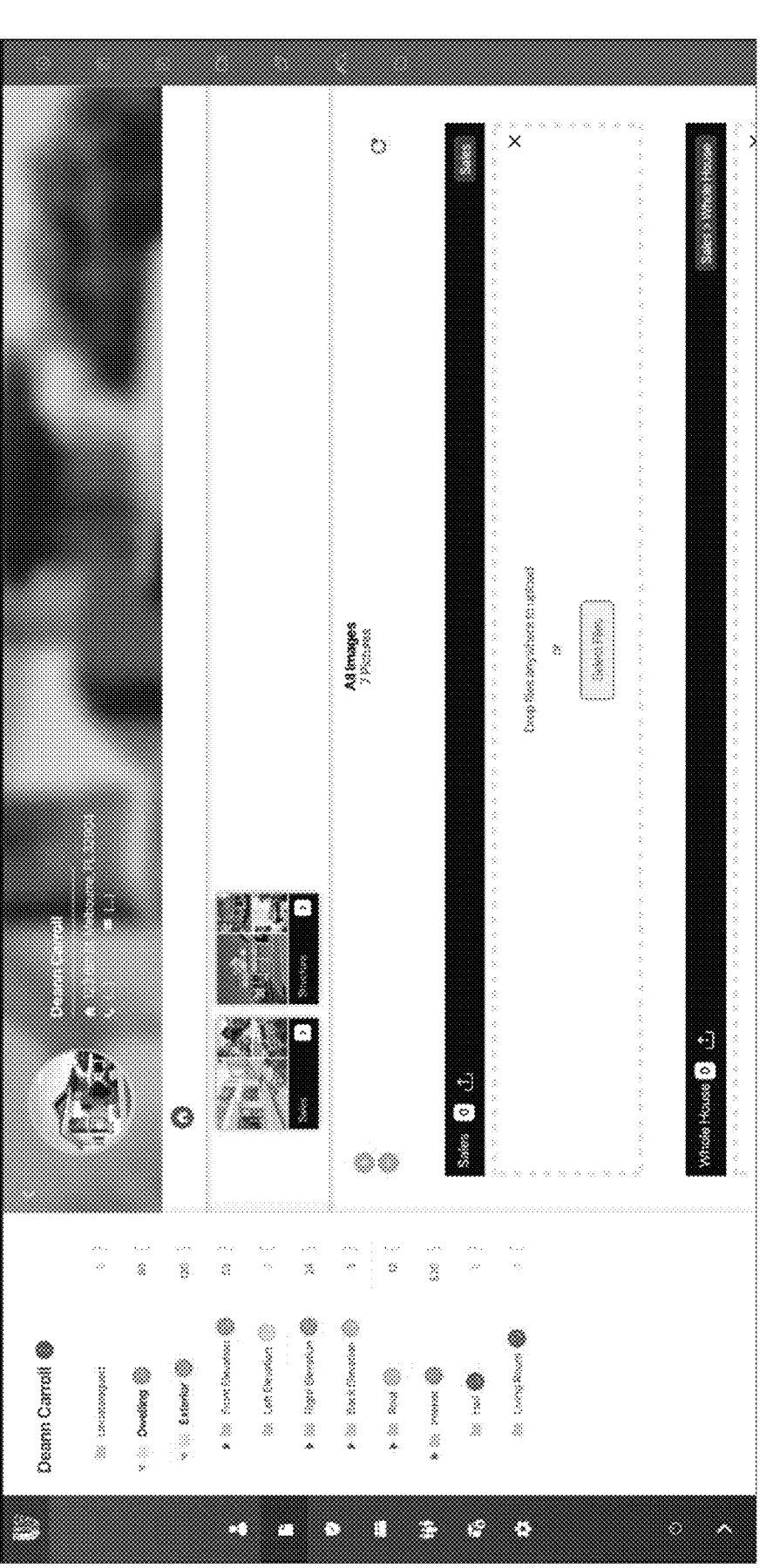
FIG. 2 is an exemplary illustration of an administrative console GUI.

In FIG. 2, on the left side, inspection categories are listed vertically in a nested fashion, with subcategories being indented from the left. The categories can be expanded or contracted. Additionally, a colored circle next to each category can show user progress for that category. Green can mean that the user has fulfilled the media capture criteria for the category. Orange can indicate that the user has made progress towards fulfilling the instructions. White or grey can indicate no instructions exist. Red can indicate new instructions exist. Red can also indicate that no progress has been made towards satisfying the instructions.

The rest of the GUI is mostly dedicated to the "Exterior" category that is selected. A user can drag media or instructions into the middle window and add captured media or instructions to the category.

Figure 3:
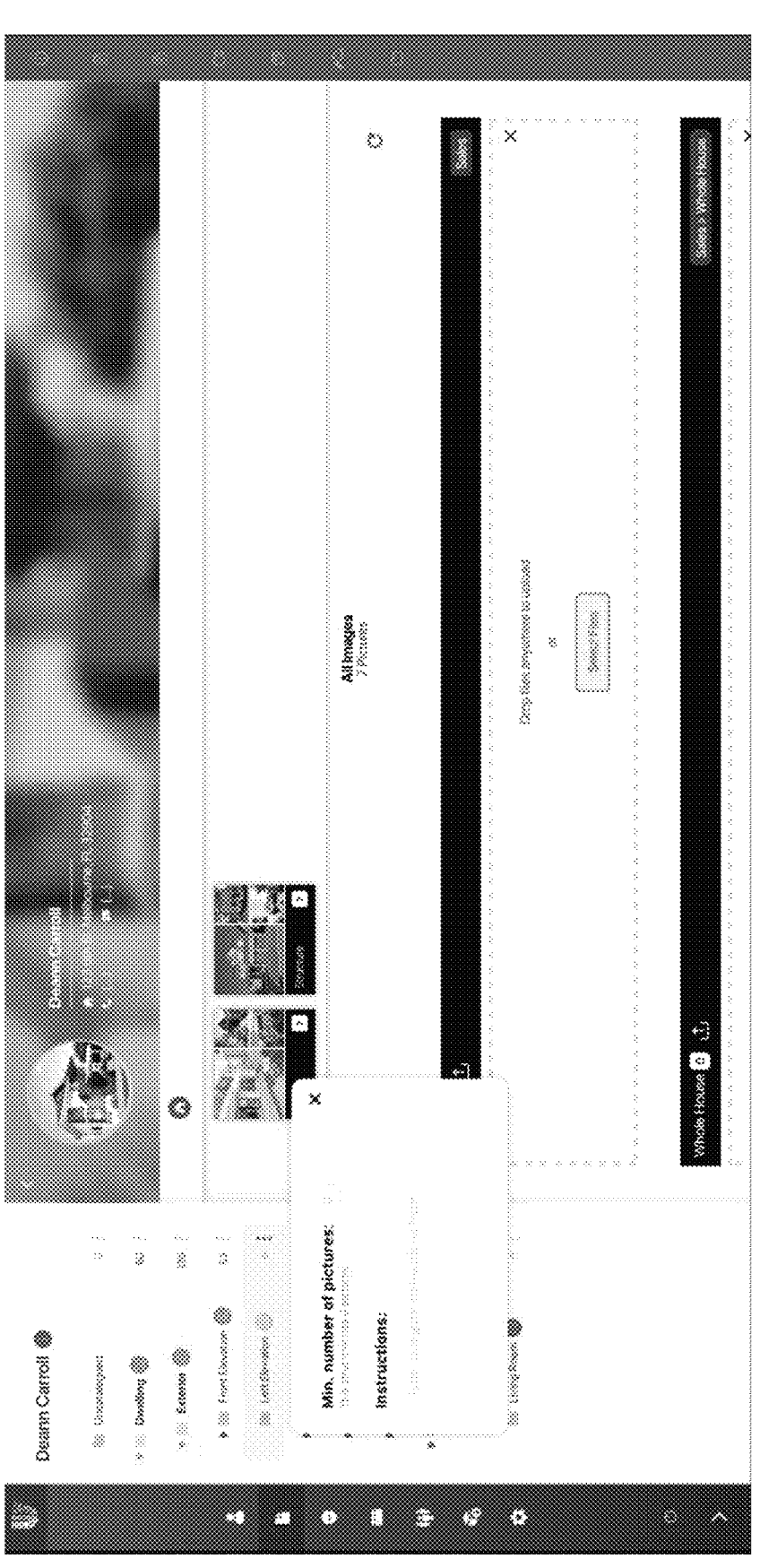
FIG. 3 is an exemplary illustration of an administrative console GUI.

FIG. 3 shows selection of a subcategory, "Left Elevation." The administrator or user with certain permissions can set the minimum number of pictures that apply to the Left Elevation subcategory. Additionally, instructions can be typed into the instructions field. These can specify which pictures to take, how close up, or any other instruction.

Figure 4:
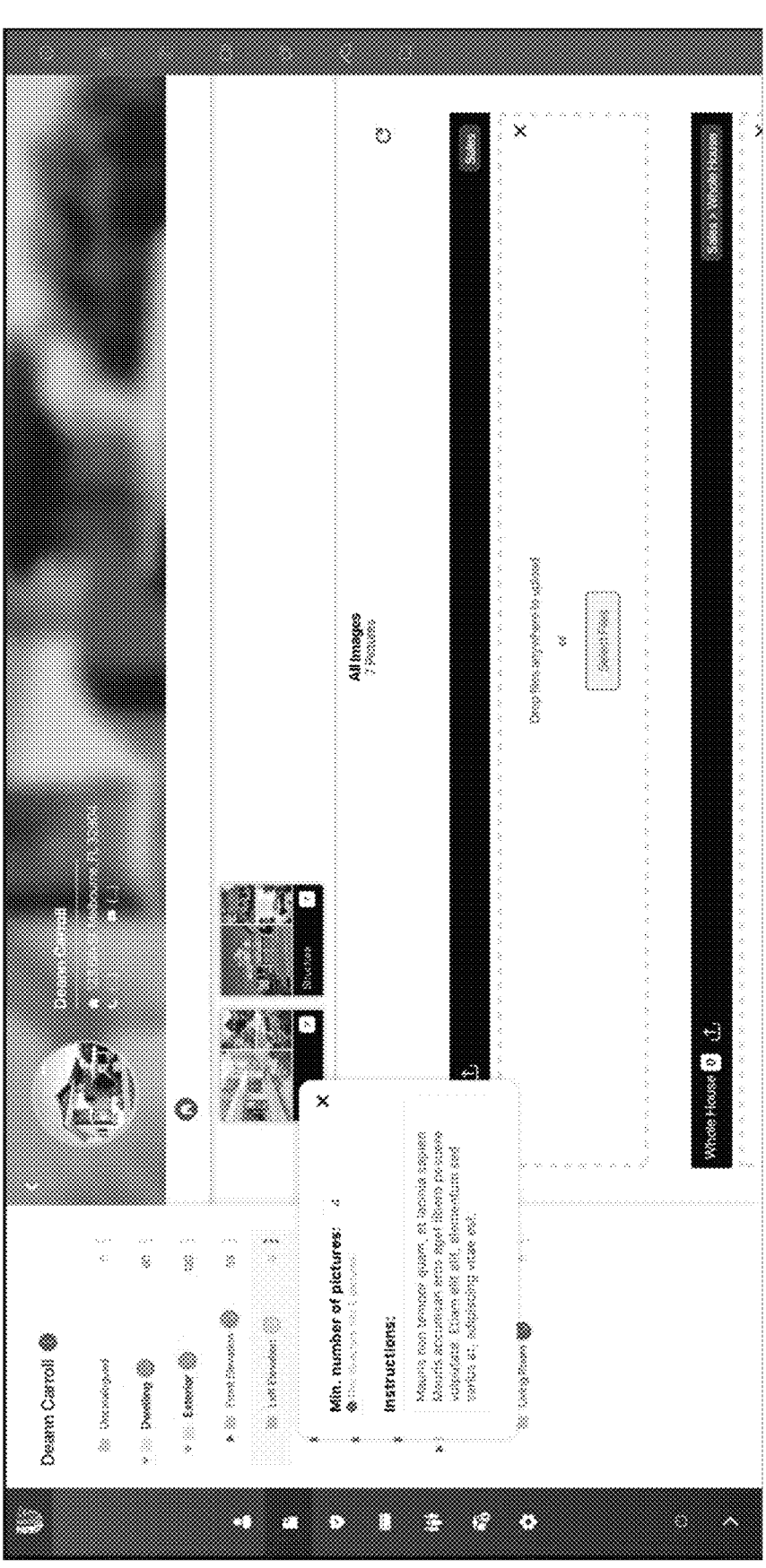
FIG. 4 is an exemplary illustration of an administrative console GUI.

FIG. 4 shows these same fields filled in. With instructions and a picture minimum now set, the status turns red.

Figure 5:
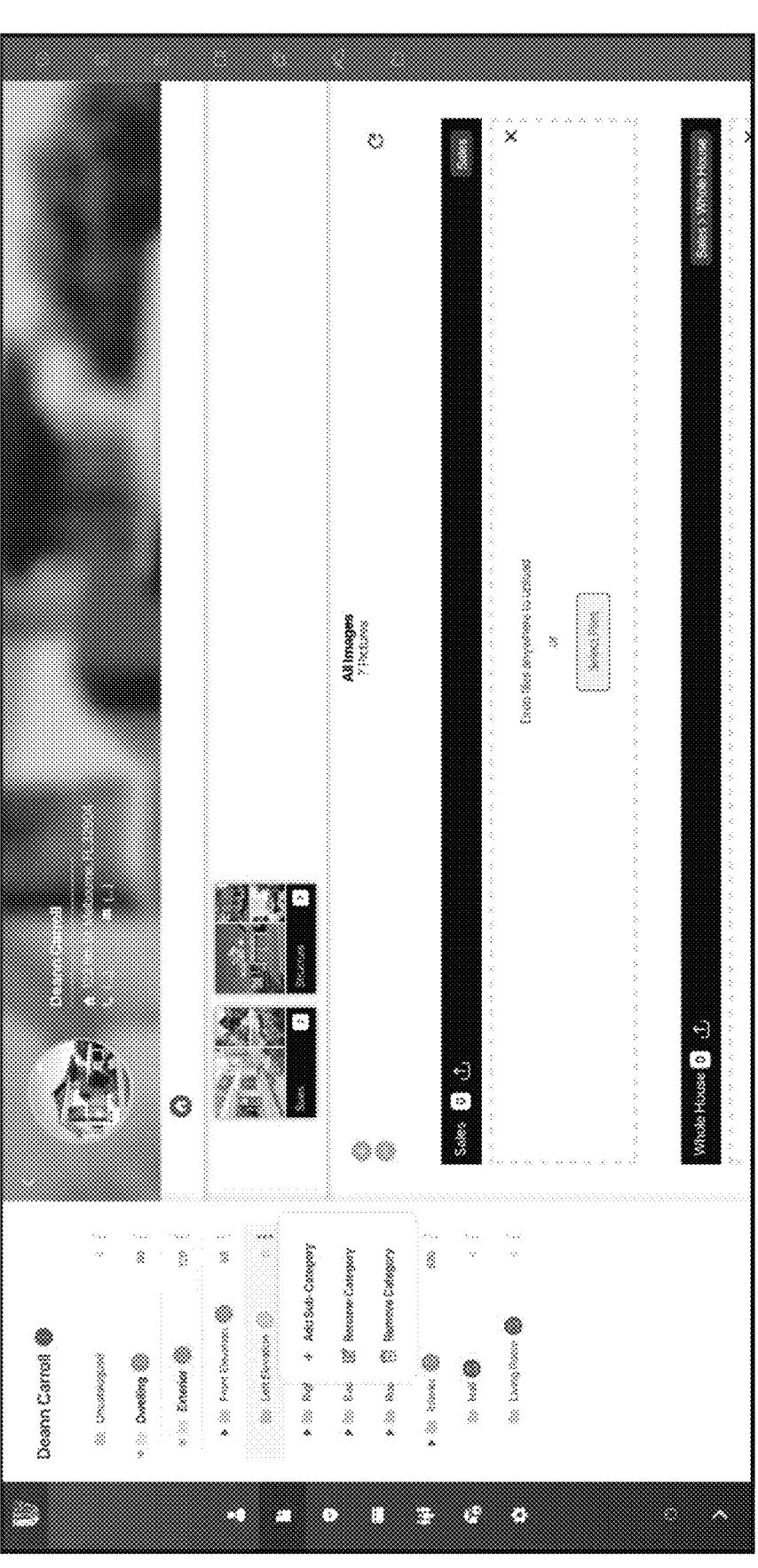
FIG. 5 is an exemplary illustration of an administrative console GUI.

FIG. 5 shows a menu for adding more base categories or subcategories to the template.

Figure 6:
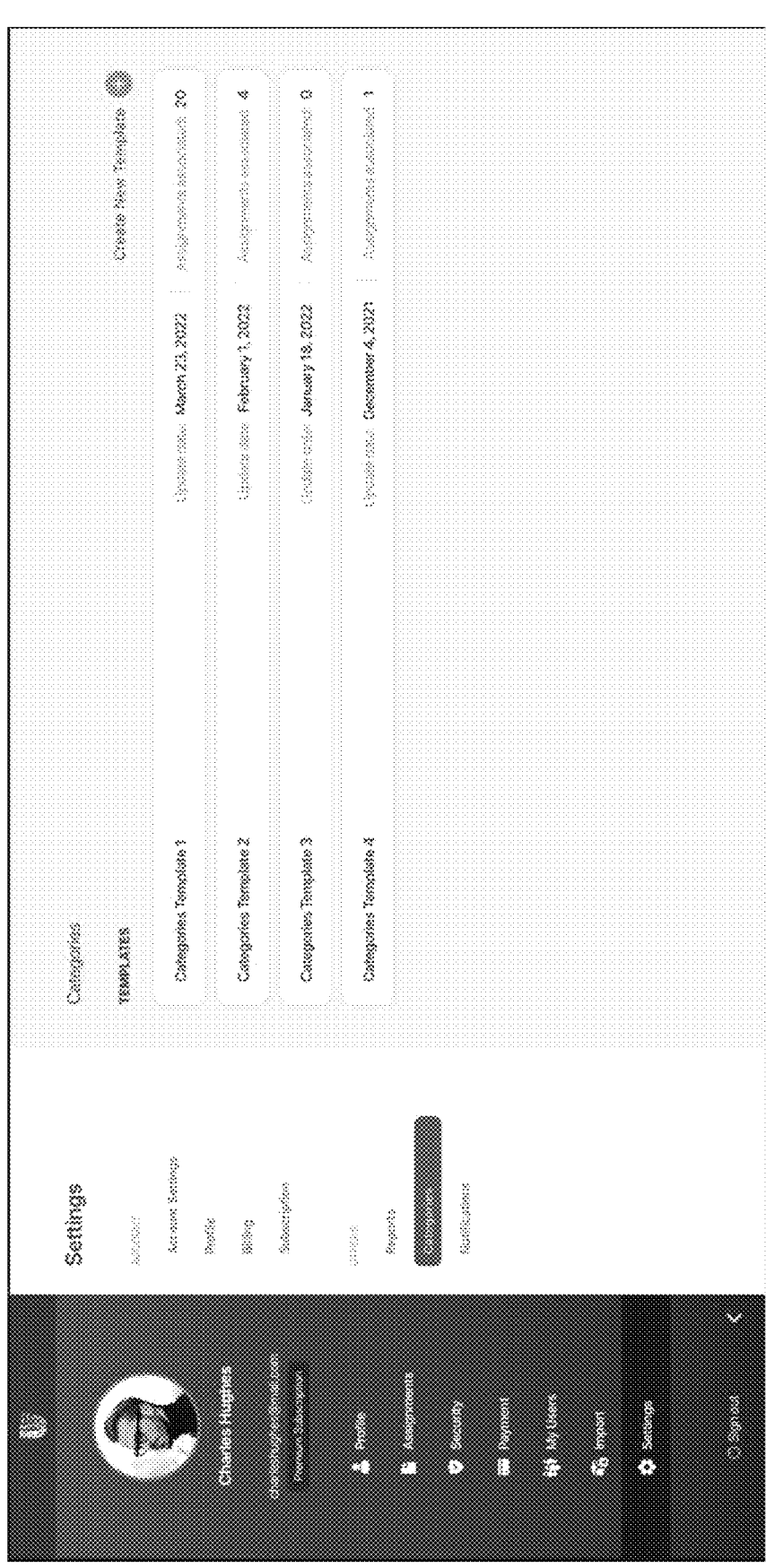
FIG. 6 is an exemplary illustration of an administrative console GUI.

FIG. 6 shows various templates that have been saved. These templates can be categorized so that they are more easily selectable for the right kinds of jobs in the future.

Figure 7:
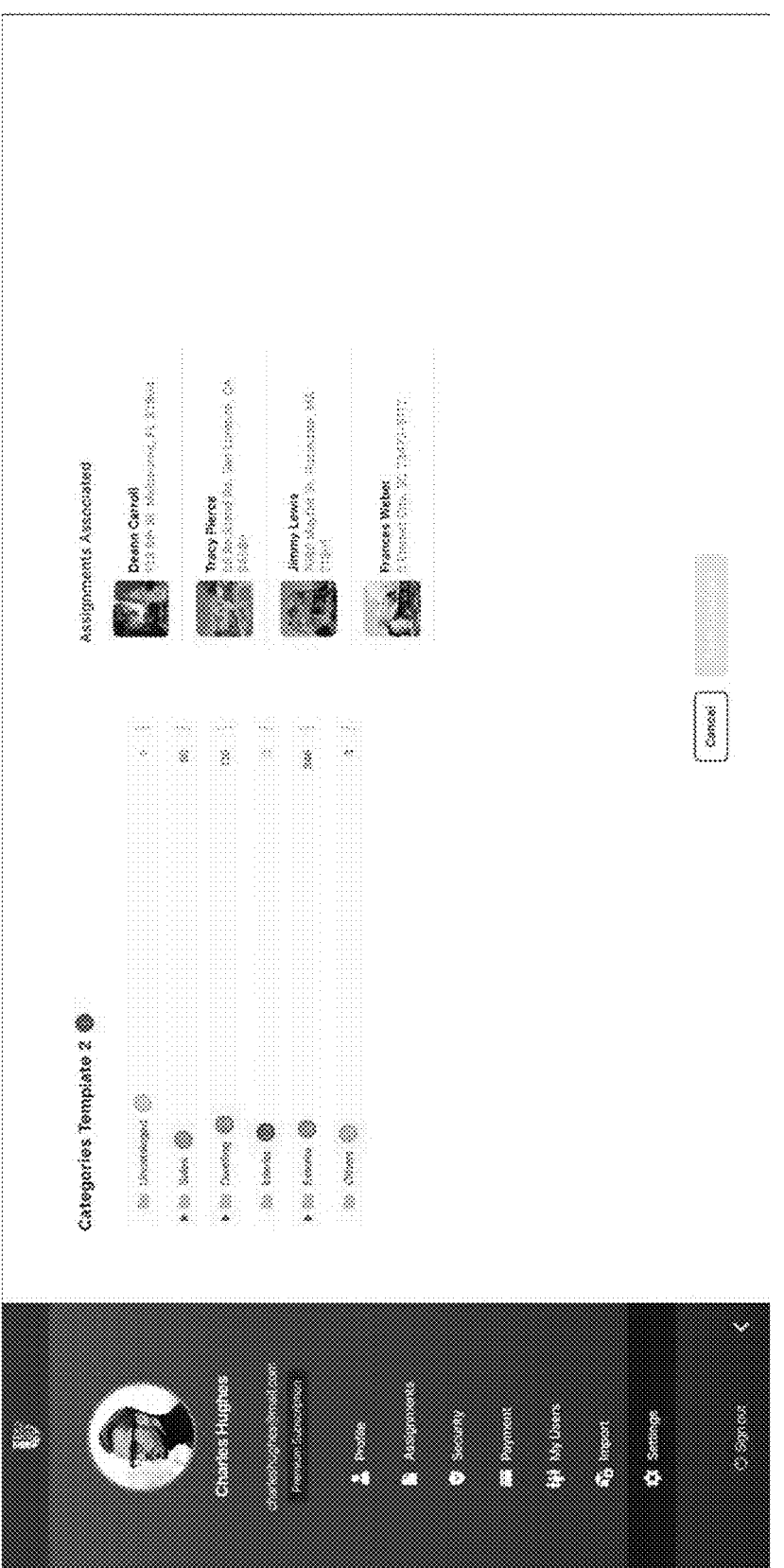
FIG. 7 is an exemplary illustration of an administrative console GUI.

In FIG. 7, the second template has been selected and assigned to four jobs shown on the right for a user named Charles Hughes.

Figure 8:
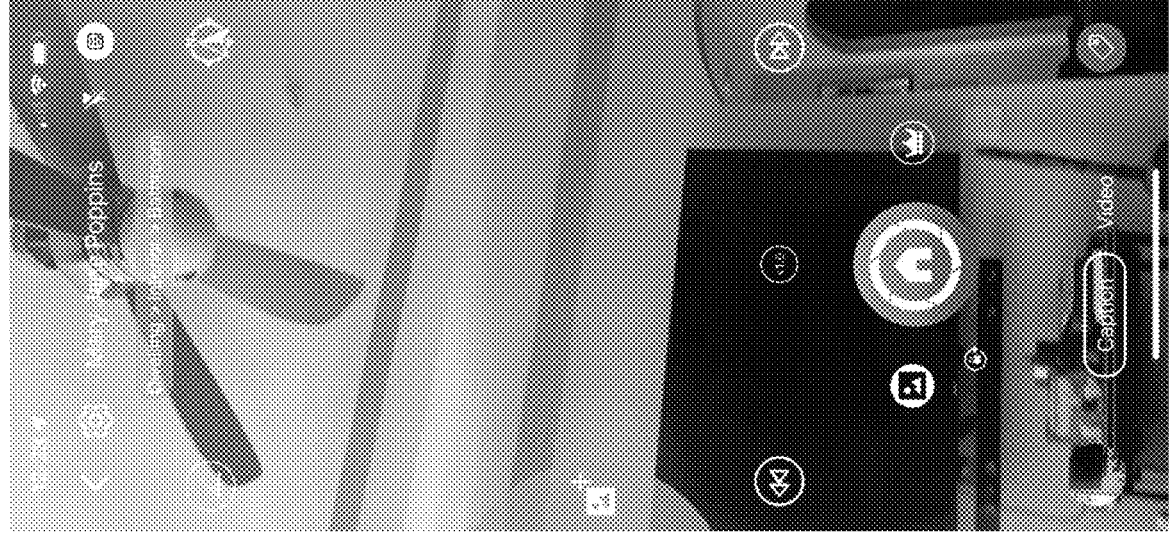
FIG. 8 is an exemplary illustration of an inspection application GUI.
Figure 9:
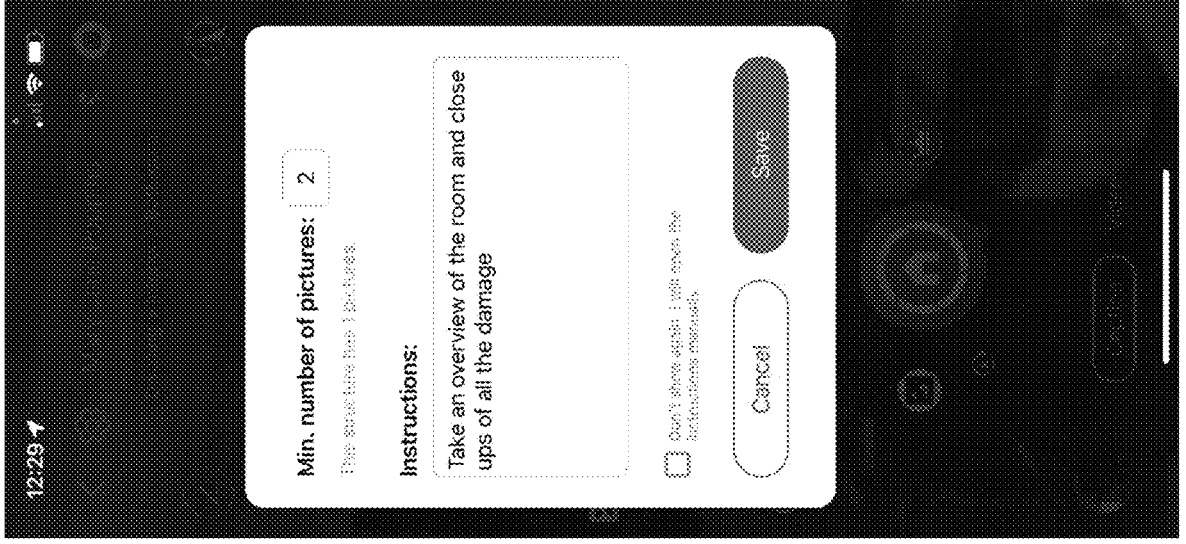
FIG. 9 is an exemplary illustration of an inspection application GUI.
Figure 10:
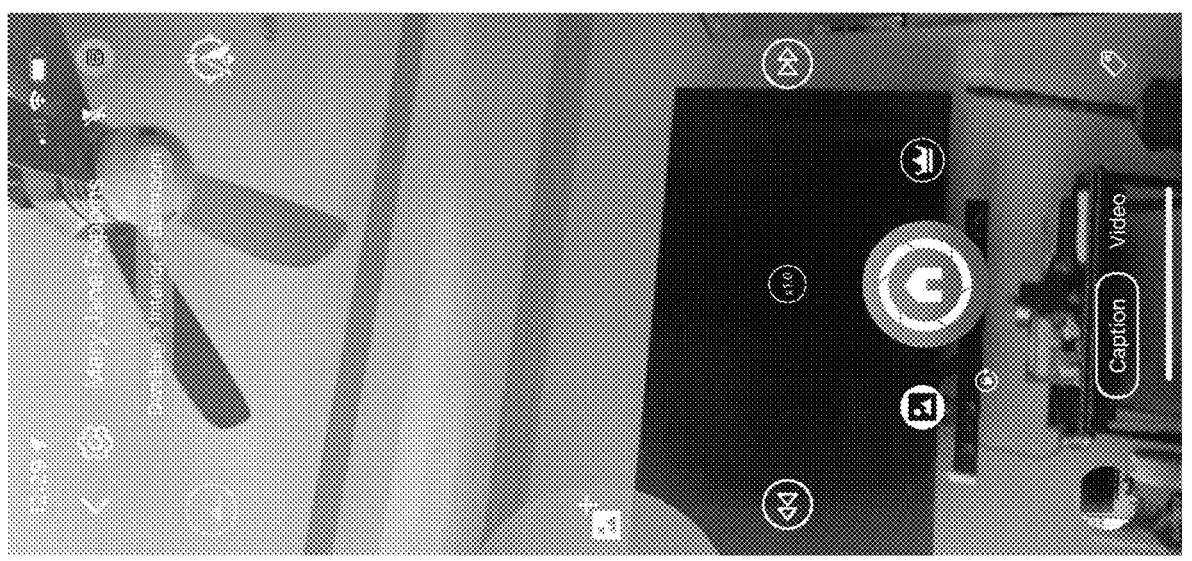
FIG. 10 is an exemplary illustration of an inspection application GUI.

FIGS. 8-10 are example illustrations of a GUI of the inspection application, which can operate on a user device or on the administrator's device.

FIG. 10 is an example illustration of a GUI presented on the user device by the inspection application. As shown at the bottom, the user can select between a caption and a video to include in the bathroom category, which is a subcategory of the interior and dwelling categories. The user can switch from caption to get a quick video that then gets stored in association with the bathroom inspection category. The user can switch back to caption, allowing for an audio or text message to be stored with a picture, such as by speaking while holding down the picture capture button.

The inspection application and the admin console can both pull up an interactive report that is dynamically built during the user's completion of the inspection categories. The inspection report can allow either user to toggle the view from tiles, to photo report, to a timeline. The timeline can present the captured media and any user comments (i.e., notes) or in the order in which they were received, as well as the instructions for the category. This can allow for later recollection of exactly what took place during the inspection.

Whereas the instructions can be added by an administrator so that the user knows what they need to look for and capture in the category (e.g., in a garage or bathroom), the notes can allow the user to explain what they were able to obtain. For example, it might not be possible to follow the instructions or it might not be clear from the captured media exactly what was captured. For example, a user might note that the shingles are too brittle to be repaired. The administrator can review the notes to see what the user is experiencing and can also reply with additional notes that the user can read in real time or at a later visit to the property.

The notes can be stored in association with the category. This can allow for generating a report where the notes are added to the corresponding section of the report. A button on the GUI can allow a user or administrator to add or hide notes. In one example, the note text itself can be toggled on and off by clicking the notes or an adjacent button. In another example, a button allows for including the notes at the end of the report or as hidden information that can be revealed with a button on the report.

The images can act as whiteboards for annotations by any user assigned to the job. This can allow for noting particular feature or to show a user where to collect more information or a different photo angle. Likewise, chats can occur on the dashboard between any users assigned to a job. These chats can be text or audio.

The interactive report can display captured video.

Figure 11:
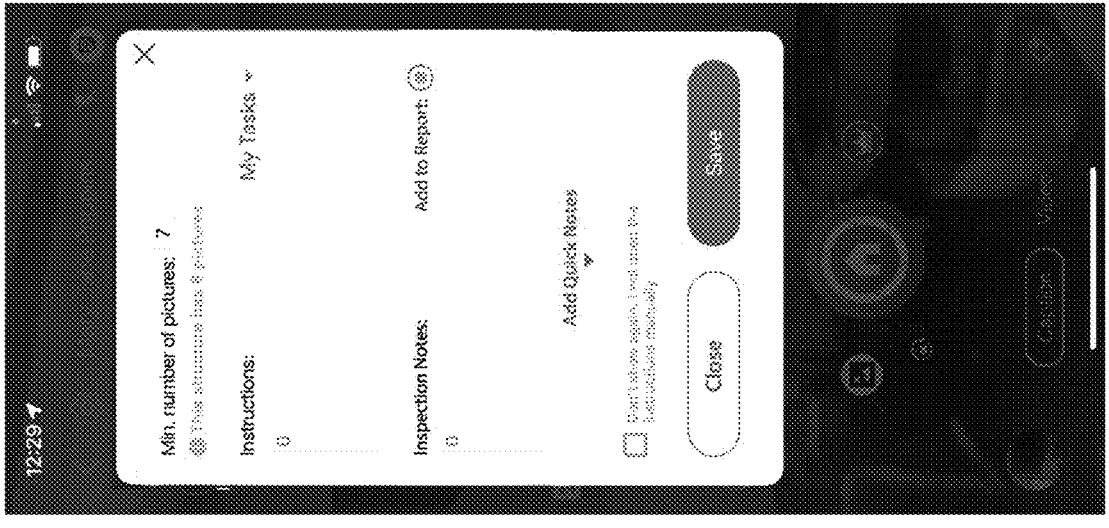
FIG. 11 is an exemplary illustration of a notes and instructions screen on a GUI.

FIG. 11 is an exemplary illustration of a notes and instructions screen on a GUI. As shown, this screen can indicate the minimum number of pictures (e.g., 7), how many have been taken (e.g., 6), an instructions pane, and a notes pane. The notes pane can include a button for adding notes to the report. Additionally, an "Add Quick Notes" option allows for adding additional notes.

Figure 12A:
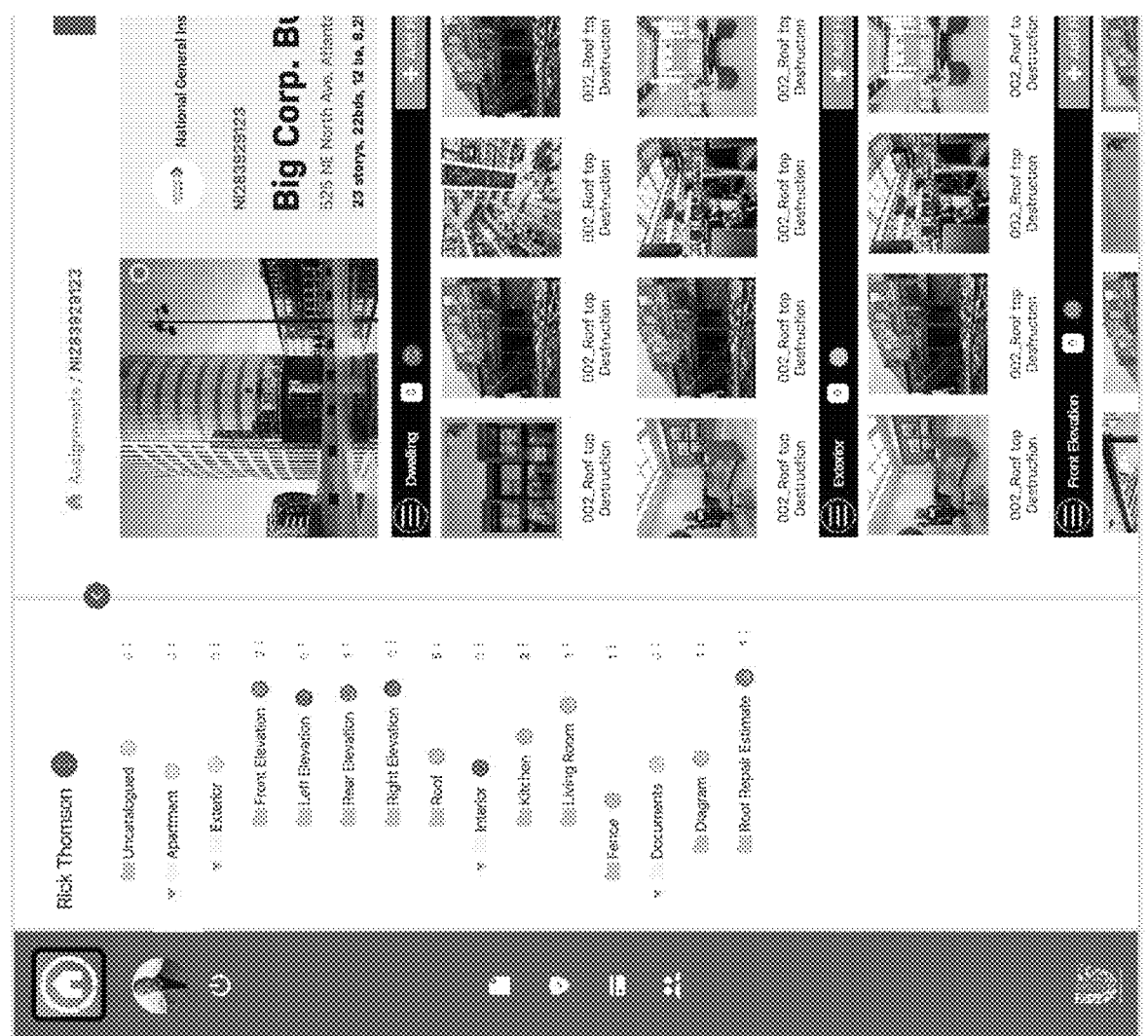
FIGS. 12A and 12B make up a single screen of a GUI, showing a media gallery.
Figure 12B:
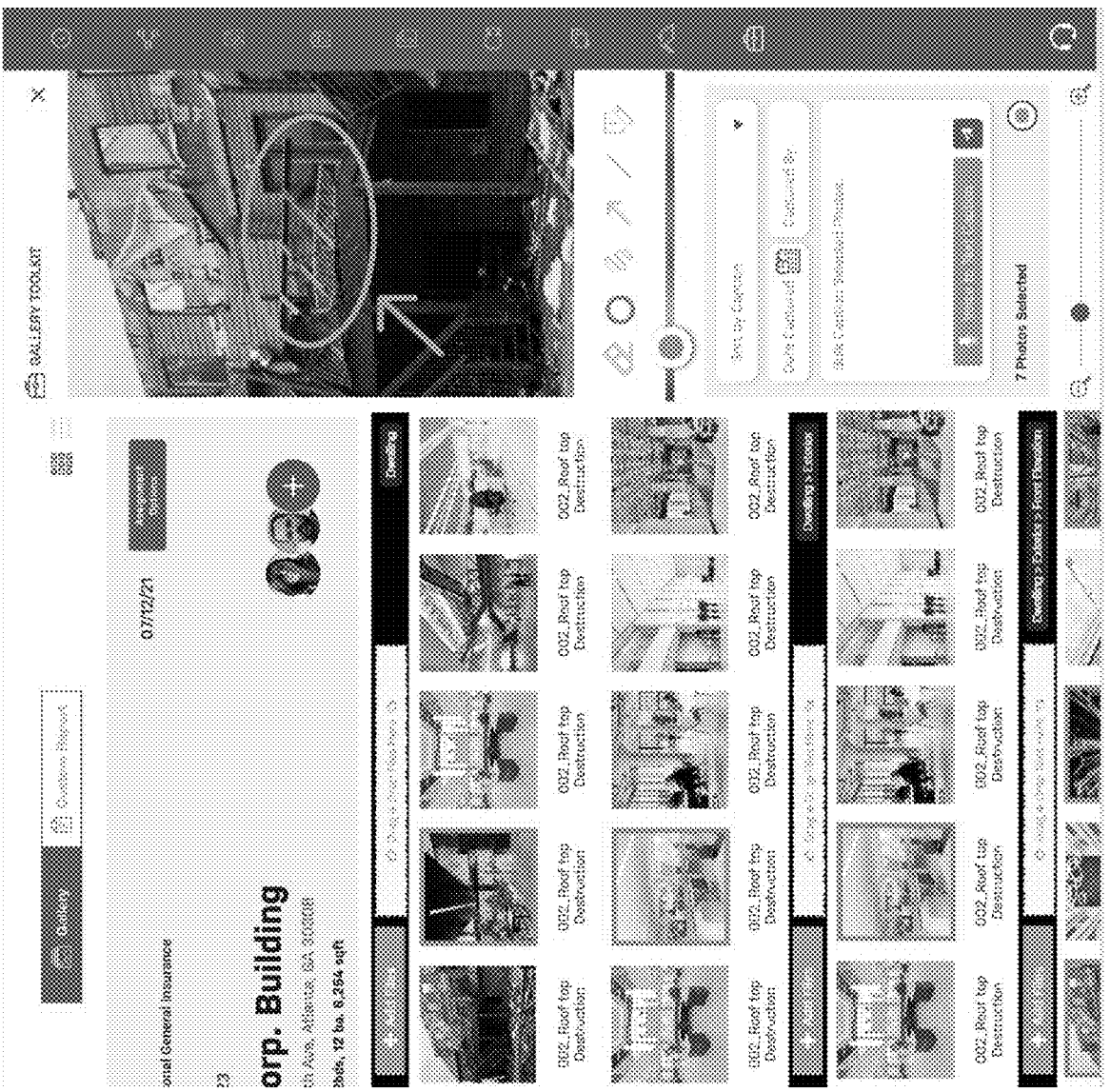

FIGS. 12A and 12B make up a single screen of a GUI, showing a media gallery. FIG. 12B shows an annotation pane in the upper right that allows a user to make markings on the image. In this example, the damaged deck railing has been circled and an arrow has been added. The pictures can be captioned as well.

In one example, the user can tap a captured image and select image recognition. This can include first storing the image in cloud storage in one example, to ensure the images are not lost. Then an image recognition process can identify damage. This can be based on a machine learning model or algorithm that is trained based on prior captions and damage identification.

When a damage type is identified, the GUI (of either the user device or administrator device) can display a contractor button that reveals suggested contractors for fixing the damage. A company associated with the job can have a preferred list of contractors for different damage types. Likewise, the system itself can track contractors commonly selected in a geographic region and recommend those.

Report templates can also be created and stored in association with the inspection templates. This can allow for customizing report layouts and settings for particular inspection templates. For example, a company logo can be provided in the report template, a cover page can be turned on and off, and so on.

It is to be understood that both the foregoing general description and the following detailed description are exemplary and explanatory only and are not restrictive of the examples, as claimed.

Other examples of the invention will be apparent to those skilled in the art from consideration of the specification and practice of the invention disclosed herein. The terms "appraiser," "inspector," "adjuster," "estimation," and "adjustment" are not meant to limit the examples and are exemplary only. Other types of users can use the systems described herein. The example systems can apply to contexts other than insurance adjustment. It is intended that the specification and examples be considered as exemplary only, with a true scope and spirit of the invention being indicated by the following claims.

What is claimed is:

1. A non-transitory, computer-readable medium containing instructions that, when executed by a processor of a computing device, cause the computing device to perform stages for managing inspections, the stages comprising:
   receiving, on a graphical user interface ("GUI") of an administrative console, selections to create inspection categories for an inspection template, wherein the inspection categories include base categories and subcategories that are organized at a hierarchically lower level than the base categories;
   applying names to the inspection categories, wherein the names are input into the GUI;

assigning instructive content to at least some of the inspection categories and a first subcategory, the instructive content explaining what is needed from an inspector for the respective category, the instructive content including text and video;
assigning a first minimum number of pictures that applies to the entire template;
assigning a second minimum number of pictures that applies to the first subcategory;
assigning the template to multiple inspection jobs;
sending the inspection template to a user device for a user assigned to one of the multiple inspection jobs, wherein the user device presents the instructive content based on which of the multiple categories is currently in progress on the user device,
wherein the inspection template specifies a minimum number and type of media items for at least one inspection category, wherein an inspection application prevents completion of the inspection job until the minimum number and type of media items are captured, and
wherein the user device executes the inspection application to at least:
   display the inspection categories of the inspection template, including color-coding the inspection categories based on completeness;
   present the instructive content for a first inspection category; and
   assign first captured media to the first inspection category,
   wherein the inspection application displays a progress indicator for each inspection category, the progress indicator dynamically changing based on satisfaction of requirements of the inspection template; and
   generate a report with a format based on the inspection template, wherein the report organizes the first captured media and other captured media based on the inspection categories.

2. The non-transitory, computer-readable medium of claim 1, the inspection template includes an editable minimum number of pictures required for the first inspection category.

3. The non-transitory, computer-readable medium of claim 2, the minimum number of pictures is editable by an administrator but not editable by another user type.

4. The non-transitory, computer-readable medium of claim 2, wherein previously taken pictures in an unassigned status are selected on the GUI and assigned to the first inspection category,
   wherein the inspection application stores captured media and inspection data locally on the user device in response to detecting lack of network connectivity, and
   wherein the inspection application automatically synchronizes the stored media and inspection data with a cloud server when connectivity is available.

5. The non-transitory, computer-readable medium of claim 1, further comprising:
   receiving a selection of a menu item on the GUI to change a current template; and
   displaying a preview template that shows a hierarchy of a potential inspection template,
   wherein the preview template is displayed prior to the potential inspection template being assigned to the multiple inspection jobs.

6. The non-transitory, computer-readable medium of claim 1, further comprising:

receiving notes related to the first inspection category from multiple different users, the notes being different than the instructive content, wherein the notes are readable by an administrator on the administrator console of the GUI.

7. The non-transitory, computer-readable medium of claim 6, further comprising:

receiving selection on the GUI to add the notes to the report, wherein the notes are added to a section of the report that includes the first captured media of the first inspection category.

8. The non-transitory, computer-readable medium of claim 1, wherein the report is generated from a report template that is stored in association with the inspection template.

9. The non-transitory, computer-readable medium of claim 1, wherein the instructive content includes a video file that plays within the inspection application.

10. The non-transitory, computer-readable medium of claim 1, wherein the instructive content explains different pictures that are needed in a room.

11. The non-transitory, computer-readable medium of claim 1, wherein the inspection template is assigned by job type.

12. The non-transitory, computer-readable medium of claim 1, wherein the administrative console performs stages comprising:

displaying a completion status of a first job; and receiving new instructive content regarding the first inspection category of the first job, wherein the inspection application updates its respective GUI to indicate the new instructive content exists.

13. The non-transitory, computer-readable medium of claim 12, wherein a first color indicates the new instructive content exists.

14. The non-transitory, computer-readable medium of claim 13, wherein a second color indicates that the user has taken a minimum number of pictures for the first inspection category.

15. The non-transitory, computer-readable medium of claim 14, wherein a third color indicates that the user has taken less than the minimum number of pictures for the first inspection category.

16. The non-transitory, computer-readable medium of claim 1, wherein the administrative console and the inspection application present a chat space for the administrator and user to both post messages and see messages, wherein the messages are stored as notes.

17. The non-transitory, computer-readable medium of claim 16, wherein the chat space is part of the first inspection category, with each inspection category having its own chat space.

18. The non-transitory, computer-readable medium of claim 17, wherein the administrator can make annotations on the captured media that appear within the inspection application, and wherein the annotations appear in the report.

19. A mobile device including a processor that executes an inspection application, the processor performing stages comprising:

receiving an inspection job and associated inspection template, wherein the inspection template includes:

inspection categories, including base categories and subcategories that are organized at a hierarchically lower level than the base categories;

instructive content assigned to at least some of the inspection categories and a subcategory, the instructive content explaining what is needed from an inspector for the respective category or subcategory;

a minimum number and type of media items for at least one inspection category, wherein the inspection application prevents completion of the inspection job until the minimum number and type of media items are captured, wherein the inspection template is received by the mobile device based on a user being assigned to a job that is associated with the inspection template, wherein the mobile device presents the instructive content based on which of the inspection categories is currently in progress on the user device, wherein the inspection template assigns the instructive content to a first category and a first subcategory, the instructive content including text and video;

wherein the inspection template assigns a first minimum number of pictures that applies to the entire template;

wherein the inspection template assigns a second minimum number of pictures that applies to the first subcategory;

displaying the inspection categories of the inspection template, including color-coding the inspection categories based on completeness;

presenting the instructive content for a first inspection category;

assigning first captured media to the first inspection category; and generating a report with a format based on the inspection template, wherein the report organizes the first captured media and other captured media based on the inspection categories.

20. A computer-implemented method, comprising:

creating an inspection template with multiple categories and subcategories under at least a first category of the multiple categories;

assigning instructive media to the first category and a first subcategory, the instructive media including text and video;

assigning a first minimum number of pictures that applies to the entire template;

assigning a second minimum number of pictures that applies to the first subcategory; and sending the inspection template to a user device based on a user being assigned to a job that is associated with the inspection template, wherein the user device presents the instructive media based on which of the multiple categories is currently in progress on the user device, wherein the inspection template specifies a minimum number and type of media items for at least one inspection category, wherein an inspection application prevents completion of the inspection job until the minimum number and type of media items are captured, wherein a user device color codes each of the multiple categories based on number of pictures taken and a presence of instructive media for each of the multiple categories, and wherein two-way communication between the user and an administrator is posted within the first category when the user is working on the first category.

* * * * *